(12) United States Patent
Wang et al.

(10) Patent No.: US 10,438,719 B1
(45) Date of Patent: Oct. 8, 2019

(54) ACTIVE VIRTUAL REALITY CABLE

(71) Applicant: AMPHENOL EAST ASIA ELECTRONIC TECHNOLOGY (SHEN ZHEN) CO., LTD., Shen Zhen, Guangdong Province (CN)

(72) Inventors: Xiang Wang, Shen Zhen (CN); Lei Liao, Shen Zhen (CN)

(73) Assignee: AMPHENOL EAST ASIA ELECTRONIC TECHNOLOGY (SHEN ZHEN) CO., LTD., Shen Zhen, Guangdong Province (CN)

( * ) Notice: Subject to any disclaimer, the term of this patent is extended or adjusted under 35 U.S.C. 154(b) by 0 days.

(21) Appl. No.: 16/401,839

(22) Filed: May 2, 2019

Related U.S. Application Data

(63) Continuation-in-part of application No. 15/981,369, filed on May 16, 2018.

(51) Int. Cl.
| | |
|---|---|
| *H01R 11/00* | (2006.01) |
| *H01B 7/00* | (2006.01) |
| *H01R 13/627* | (2006.01) |
| *H01R 107/00* | (2006.01) |
| *H01R 24/20* | (2011.01) |
| *H01R 12/53* | (2011.01) |

(52) U.S. Cl.
CPC ......... *H01B 7/009* (2013.01); *H01R 13/6275* (2013.01); *H01R 12/53* (2013.01); *H01R 24/20* (2013.01); *H01R 2107/00* (2013.01); *H01R 2201/06* (2013.01)

(58) Field of Classification Search
CPC ...... H01R 25/003; H01R 31/06; H01R 33/92; H01B 7/221; H02G 3/26; F16G 13/16
USPC .............. 439/214, 502, 505, 623, 638, 639; 174/70 A, 72 C, 72 R
See application file for complete search history.

(56) References Cited

U.S. PATENT DOCUMENTS

| | | | | |
|---|---|---|---|---|
| 6,907,615 | B1 * | 6/2005 | Alexander | H04N 5/4401 348/E5.108 |
| 7,057,108 | B1 * | 6/2006 | Sodemann | H01R 13/7135 174/71 R |
| 7,229,302 | B1 * | 6/2007 | Lai | H01R 25/003 439/214 |
| 7,273,384 | B1 * | 9/2007 | So | H01R 13/447 439/172 |
| 7,572,143 | B2 * | 8/2009 | Harris | G06F 1/1632 439/502 |

(Continued)

*Primary Examiner* — Thanh Tam T Le
(74) *Attorney, Agent, or Firm* — Muncy, Geissler, Olds & Lowe, PC

(57) ABSTRACT

An active virtual reality cable includes a main wire, a plurality of wire branches, a transfer member, and a control member. The transfer member is connected with the main wire and the wire branches. The control member has one end connected with the main wire and the other end connected with the motherboard of the virtual reality equipment. The wire branches include at least two wires. With the control member, the DC power wire is combined with various signal wires, increasing cable functions and meeting the development trend of product digitalization and integration. Multi-sectional structure of the main wire facilitates the storing and replacing operation of the cable, meeting various usage requirements of the customers nowadays. The extension distance of the cable is improved through the 42P OCulink plug. Also, the cost of manufacturing is lowered.

5 Claims, 5 Drawing Sheets

(56) References Cited

U.S. PATENT DOCUMENTS

| | | | | |
|---|---|---|---|---|
| 7,591,673 B2* | 9/2009 | Chan | ............... | G06F 1/266 |
| | | | | 439/502 |
| 7,871,293 B1* | 1/2011 | Chung | ............... | H01B 11/12 |
| | | | | 174/72 A |
| 8,308,507 B2* | 11/2012 | Lin | ............... | H01R 25/003 |
| | | | | 439/502 |
| 8,916,774 B2* | 12/2014 | Richards | ............... | H02G 3/0487 |
| | | | | 174/70 C |
| 9,042,699 B2* | 5/2015 | Barry | ............... | G02B 6/3897 |
| | | | | 385/135 |

* cited by examiner

ACTIVE VIRTUAL REALITY CABLE

CROSS REFERENCE TO RELATED APPLICATIONS

This application is a Continuation-in-Part of co-pending application Ser. No. 15/981,369, filed on 16 May 2018, for which priority is claimed under 35 U.S.C. § 120, the entire contents of all of which are hereby incorporated by reference.

BACKGROUND OF THE INVENTION

1. Field of the Invention

The present invention relates to virtual reality (VR) connection devices, and more particularly, to an active virtual reality cable.

2. Description of the Related Art

When an electronic device works with an internally existing power, such electronic device is defined as an active device, so that the active device is allowed to achieve certain functions with an aid of the power energy. Active device includes two categories, mainly discrete device and integrated circuit. An active cable refers to a communication device which depends on an external power to transmit signal and data during the communication process. Active cables are usually applied for signal amplification or transformation. With the development of virtual reality (VR) market, consumers are progressively paying attention to a three-dimensional and dynamically immersive experience formed of games, videos, and social interaction. In high-end VR products, the connection hardware between a high performance host machine and the VR headset imposes a significant effect upon the product performance. Previously, at least two to three video cables, such as high definition multimedia interface (HDMI), universal serial bus (USB) or DC cables, are tied into a bundle to be applied together for VR equipment connection.

SUMMARY OF THE INVENTION

For improving the issues above, a cable is provided as a connection resolution between the virtual reality (VR) headset and a computer host machine. The cables combines various kinds of signal wires and a power cable, so as to be easily applied and stored, and the cost thereof is lowered.

For achieving the aforementioned objectives, an active virtual reality cable in accordance with an embodiment of the present invention is provided for connecting a motherboard of the virtual reality equipment and a personal computer, the active virtual reality cable comprising, a main wire, a plurality of wire branches, a transfer member, and a control member.

The transfer member connects the main wire and the plurality of wire branches. The transfer member is a printed circuit board which comprises a first transfer end connected with one end of the main wire and a second transfer end connected with one end of the plurality of wire branches, respectively. The plurality of wire branches have another end thereof connected with the personal computer.

The control member is connected with another end of the main wire, so that the control member is connected with the virtual reality equipment. The connection port between the control member and the motherboard of the virtual reality equipment is in a form selected from a group consisting of an integrated circuit (IC) module, a 42-pin input/output socket, and a video socket.

Preferably, the wires of the wire branch are selected from the group consisting of a high definition multimedia interface (HDMI), universal serial bus (USB), DisplayPort (DP), Type C, and a combination thereof.

Preferably, the active virtual reality cable includes an extension wire which is a passive cable, with one end thereof connected with the control member through an OCulink plug, such that the control member is connected with the motherboard of the virtual reality equipment through the extension wire.

Preferably, the transfer member further includes an extensive power socket.

Preferably, the control member includes a first plug end having an engage space. The extension wire includes a second plug end having a hook end and a press end. The hook end is resilient and disposed at the position corresponding to the engage space. The press end extends from the hook end and protrudes out of the first plug end.

When the control member and the extension wire are combined together through the first plug end and the second plug end, the hook end is stably clamped in the engage space. When the press end is imposed with a downward external force, the hook end is triggered to leave the engage space.

With such technical resolution, by use of the switch card in the transfer member, the active virtual reality cable in accordance with an embodiment of the present invention is allowed to combine a DC wire with multiple signal wires, such as HDMI, USB, DP or Type C wires, so as to increase the functions of a singular cable, which meets the developing trend of product digitalization and integration. The multi-sectional structure formed of the main wire, the wire branch, and the extension wire facilitates the storing and replacing process of the cable, thus meeting various usage requirements of the customers nowadays. The extension wire is connected with the main wire through the 42-pin OCulink plug, so as to improve the extension distance of the cable. Also, the cost of manufacturing is lowered, which makes the cable more competitive in the market.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 5, several embodiments of the present invention are provided for illustrating the technical features of the present invention.

Embodiment 1

Figure 1:
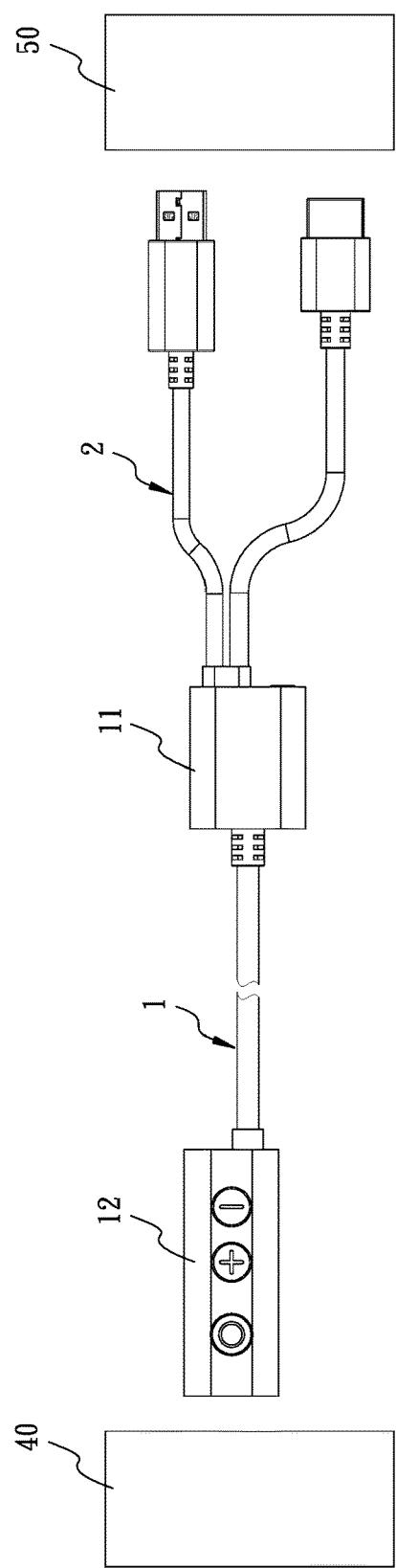
FIG. 1 is a schematic view illustrating structure of the active virtual reality cable in accordance with an embodiment of the present invention.
Figure 2:
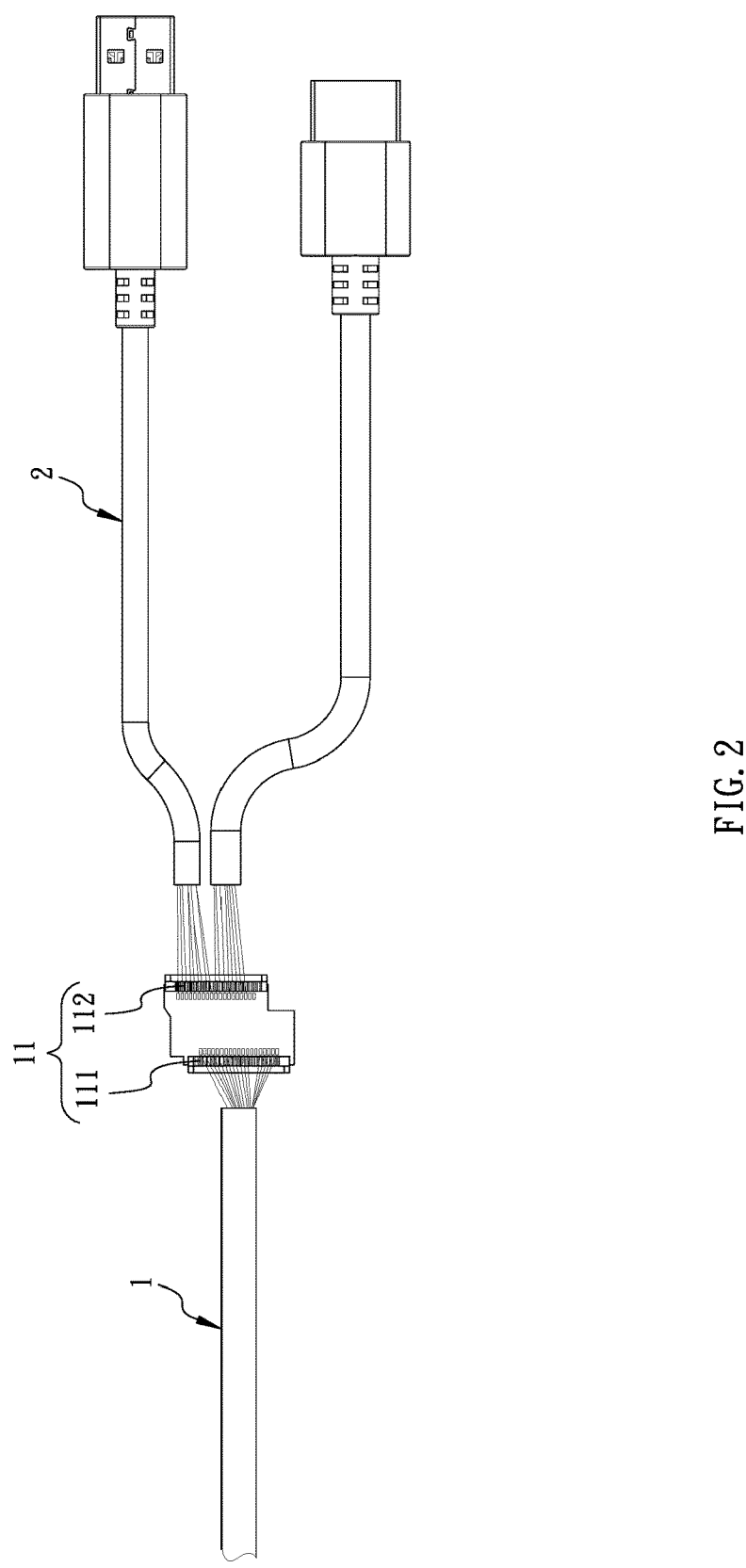
FIG. 2 is a schematic view illustrating the main wire connected with the wire branch through the switch card.
Figure 3:
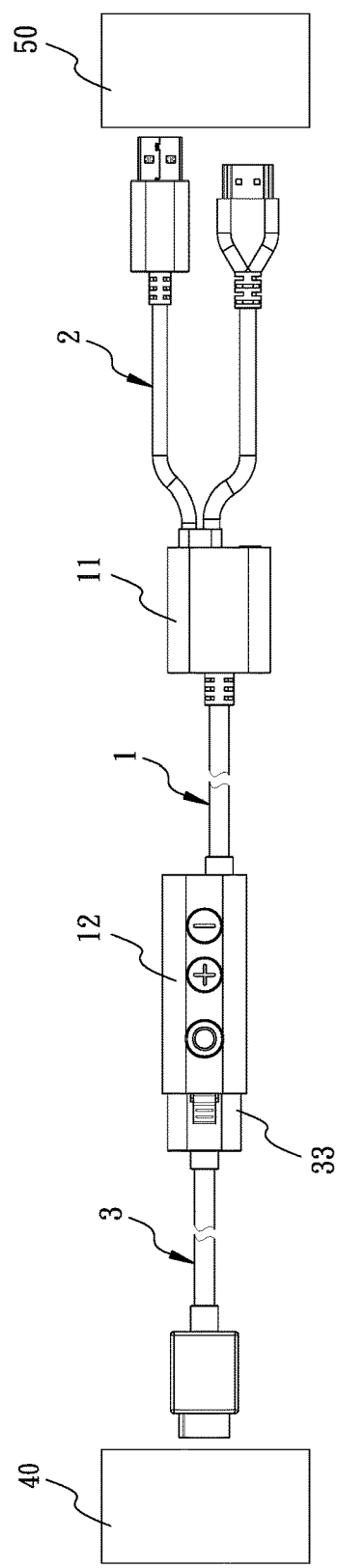
FIG. 3 is a schematic view illustrating the main wire connected by use of the extension wire.

Referring to FIG. 1 to FIG. 3, an active virtual reality (VR) cable is provided for connecting a motherboard 40 of a virtual reality equipment and a personal computer 50, the active virtual reality (VR) cable includes a main wire 1, a plurality of wire branches 2, a transfer member 11, and a control member 12.

The transfer member 11 is connected with the main wire 1 and the plurality of wire branches 2, respectively. The transfer member 11 is a printed circuit board and comprises a first transfer end 111 connected with an end of the main wire 1 and a second transfer end 112 connected with an end of the plurality of wire branches 2, respectively. The plurality of wire branches 2 have another end thereof connected with the personal computer 50. It is noted that the plurality of wire branches may also include a direct current (DC) power cable for connecting a direct current power source, so as to directly provide the power needed for the motherboard 40 or other circuits of the virtual reality equipment.

The control member 12 is connected to another end of the main wire 1, so as to be connected with the motherboard 40 of the virtual reality equipment.

The wire branches 2 include at least two wires selected from the group consisting of a high definition multimedia interface (HDMI), universal serial bus (USB), DisplayPort (DP), Type C wire, or any combination thereof.

Referring to FIG. 3, the active virtual reality cable in accordance with the embodiment includes an extension wire 3 which is a passive cable, with one end of the extension wire 3 connected with the main wire 1 through the OCulink plug, such that the control member 12 is connected with the motherboard 40 of the virtual reality equipment through the extension wire 3. Also, the connection port between the control member and the motherboard of the virtual reality equipment is in a form selected from a group consisting of an integrated circuit (IC) module, a 42-pin input/output socket, and a video socket.

Embodiment 2

Figure 4:
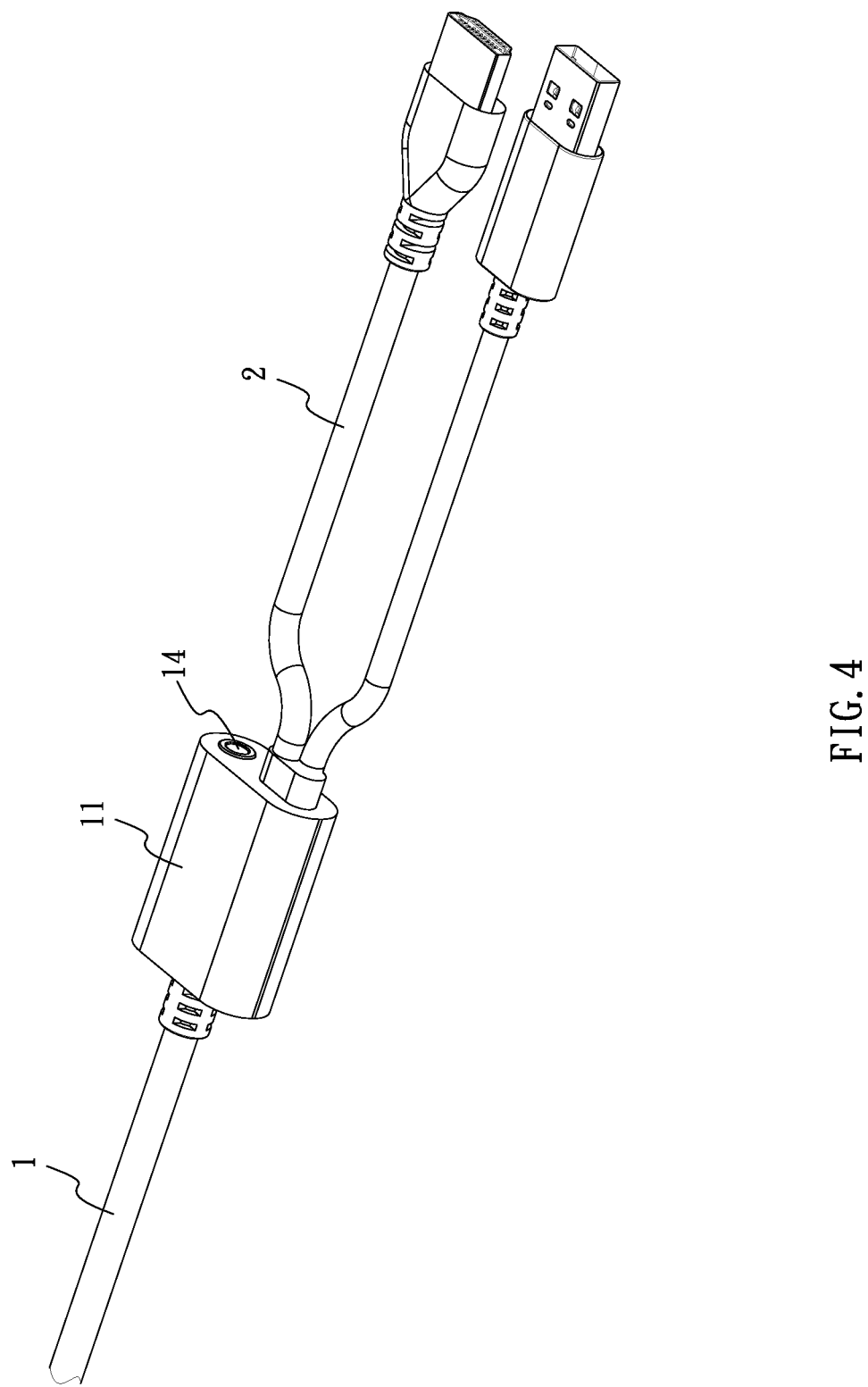
FIG. 4 is a schematic view illustrating the transfer member provided with an extensive power socket.

Referring to FIG. 4, based on the first embodiment, the transfer member 11 further includes an extensive power socket 14.

Embodiment 3

Figure 5:
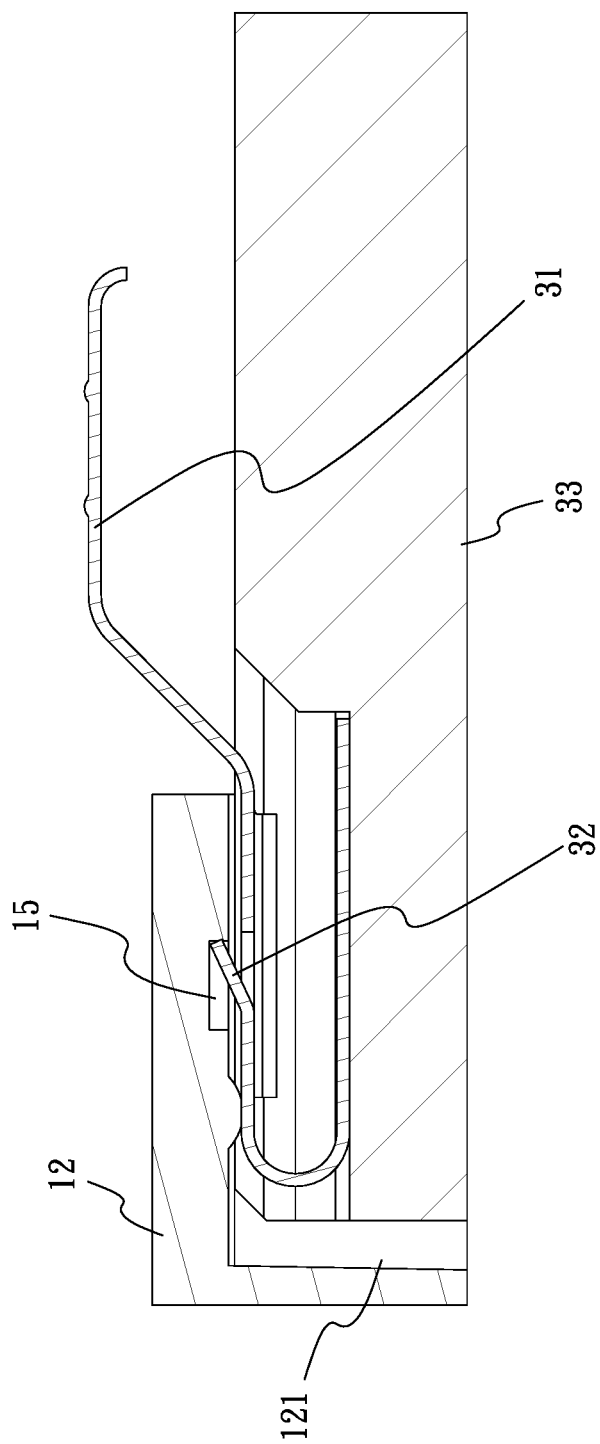
FIG. 5 is a schematic view illustrating the main wire connected with the clamp member of the extension wire through the engage space.

Referring to FIG. 3 and FIG. 5, based on the first embodiment, the control member 12 of the active virtual reality cable includes a first plug end 121 having an engage space 15, and the extension wire 3 includes a second plug end 33 having a hook end 32 and a press end 31. The hook end 32 is resilient and disposed at the position corresponding to the engage space 15. The press end 31 extends from the hook end 32 and protrudes out of the first plug end 121.

When the control member 12 and the extension wire 3 are combined through the first plug end 121 and the second plug end 33, the hook end 32 is stably clamped in the engage space 15. When the press end 31 is imposed with a downward external force, the hook end 32 is triggered to leave the engage space 15.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An active virtual reality cable for connecting a motherboard of a virtual reality equipment and a personal computer, characterized in that the active virtual reality cable comprises:

a main wire and a plurality of wire branches;

a transfer member connecting the main wire and the plurality of wire branches, the transfer member being a printed circuit board, the transfer member including a first transfer end connected with one end of the main wire and a second transfer end connected with an end of the plurality of wire branches, respectively, the plurality of wire branches having another end thereof connected with the personal computer;

a control member connected with another end of the main wire, the control member connected with the motherboard of the virtual reality equipment, with a connection port between the control member and the motherboard of the virtual reality equipment being selected from a group consisting of an integrated circuit module, a 42-pin input/output socket, and a video socket.

2. The active virtual reality cable of claim 1, characterized in that:

the plurality of wire branches are selected from the group consisting of a high definition multimedia interface, universal serial bus, DisplayPort, Type C, and a combination thereof.

3. The active virtual reality cable of claim 1, characterized in that:

the active virtual reality cable further comprises an extension wire which is a passive cable, with one end of the extension wire connected with the control member through an OCulink plug, such that the control member is connected with the motherboard of the virtual reality equipment through the extension wire.

4. The active virtual reality cable of claim 1, characterized in that:

the transfer member further includes an extensive power socket.

5. The active virtual reality cable of claim 3, characterized in that:

the control member includes a first plug end having an engage space; the extension wire includes a second plug end having a hook end and a press end; the hook end is resilient and disposed at a position corresponding to the engage space; and the press end extends from the hook end and protrudes out of the first plug end;

when the control member and the extension wire are combined through the extension wire through the first plug end and the second plug end, the hook end is stably clamped in the engage space; when the press end is imposed with a downward external force, the hook end is triggered to leave the engage space.

* * * * *